United States Patent
Pajot (10) Patent No.: US 6,684,983 B1
(45) Date of Patent: Feb. 3, 2004

(54) OPTIMIZED SPLIT TYPE EXPANDER FOR ADJUSTABLE PISTON ACTUATORS FOR MULTI-DISK BRAKES AND CLUTCHES

(75) Inventor: Joseph J. Pajot, Granger, IN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/214,648

(22) Filed: Aug. 8, 2002

(51) Int. Cl.⁷ .............................................. F16D 55/02
(52) U.S. Cl. ............... 188/71.8; 188/196 R; 188/196 P
(58) Field of Search ............................. 188/71.8, 71.9, 188/196 R, 196 P, 374; 192/111 A, 20.25; 92/13.1, 13.7, 52

(56) References Cited

U.S. PATENT DOCUMENTS

| | | | |
|---|---|---|---|
| 4,503,950 A | * | 3/1985 | Anderson ................ 188/196 R |
| 4,751,985 A | | 6/1988 | Chambers .................. 188/71.8 |
| 5,154,262 A | | 10/1992 | Berwanger .................. 188/196 |
| 5,219,046 A | * | 6/1993 | Clark ........................ 188/71.8 |
| 6,234,279 B1 | | 5/2001 | Jankowski ................. 188/71.8 |

* cited by examiner

Primary Examiner—Douglas C. Butler
(74) Attorney, Agent, or Firm—Larry J. Palguta (57) ABSTRACT

A brake adjustment mechanism maintains a brake actuating piston (17) stroke within a preferred range compensating for brake wear by repositioning the piston along a deformable adjustment tube (33). The tube is deformed when excessive piston travel draws the tube along a tube expanding member (51). Adjustment mechanism stresses are minimized by insuring the annular regions of contact between the outer surface (59) of the expanding member (51) and the tube (33) as well as between the inner surface (57) of the expanding member (51) and an expanding member retaining groove (55) in a cantilevered pin (49) are smooth lacking both sharp corners and flat regions. The expanding member (typically a split ring) engaging the deformable tube along an annular surface (59) of the tube and also engages the annular groove along an annular surface (55) of the pin groove. Normals (63) to the deformable tube surface are more nearly orthogonal to the pin axis (43) than normals (61) to the pin groove annular surface.

20 Claims, 5 Drawing Sheets

OPTIMIZED SPLIT TYPE EXPANDER FOR ADJUSTABLE PISTON ACTUATORS FOR MULTI-DISK BRAKES AND CLUTCHES

BACKGROUND OF THE INVENTION

1. Field of the Invention

The present invention relates generally to methods and apparatus for adjusting hydraulic brake pistons, for example, to compensate for brake friction surfaces wear, and more especially to the reduction of stress concentrations in internal automatic adjusters for such brake pistons.

2. Description of the Related Art

It is common knowledge that vehicle braking action over a period of time causes wear of the brake pads or other friction surfaces resulting in increased clearance between the braking surfaces and requiring a longer stroke of the brake actuator piston to effect braking. At one time this problem was alleviated by periodic manual adjustment of the brake system. Automatic adjustment schemes have largely eliminated the need for such periodic manual adjustments.

For example, in a piston actuated multi-disk brake, the brake is actuated by one or more pistons which extend axially from the brake structure and bear against the brake disks or pads. As the brake wears, a greater amount of piston extension is needed to actuate the brake. An adjuster mechanism allows the piston to maintain a set range of travel during actuation despite the increasing total extension. This is commonly accomplished by the use of a tube and expander adjuster system. A common adjuster mechanism employs an expander which is pulled through a plastically deformable tube, and in the process, adjusting the retracted position of the piston.

In this type system, a tube is forced against an internal expander causing the tube to plastically deform when a certain load is reached. This deformation allows the tube to slide past the expander as long as sufficient load is maintained. Typically, the expander is attached to a pin, which is restrained by the brake structure. The tube is held against the expander by a preloaded spring placed in series between the piston and the tube. When brake pressure is applied the piston travels and the spring is further compressed, causing a small increase in load in the adjuster. The piston must travel through a small running clearance before engaging the brake. After engaging the brake, nearly all of the incremental piston force is delivered to the brake, with a small amount split off to further compress the spring. When the piston travels far enough, a direct load path from the piston to the adjuster occurs causing a significant increase in the adjuster load. When a sufficient portion of the piston load is split off into the adjuster, an adjustment event occurs and the tube begins to deform or pull through. The load needed to deform the tube is known as the pull through load. Any additional piston travel beyond this point will produce a finite amount of adjuster pull through. When brake pressure is removed, the spring forces the piston to retract to a rest position. If any pull through has occurred, then the piston will come to rest in a position slightly extended beyond its previous rest position. This incremental extension corresponds to the increment in brake wear since the last adjustment event or occurrence of pull through.

The adjuster tube is typically a thin walled metal tube with a lubricant applied to its inside surface. The expander often resembles a donut and has an outside diameter slightly larger than the inside diameter of the tube. The expander may be attached to the adjuster pin by being threaded onto the end of the pin or held on by a separate nut. High stresses in the threaded portion of the pin typically limit the service life of the pin and the reliability of the adjuster mechanism.

U.S. Pat. No. 4,751,985 illustrates a system where the brake piston adjuster mechanism includes a radially outwardly expandable or deformable adjuster tube which is attached to the brake piston and engaged by a fixed deforming member comprising a cantilevered adjuster pin having a threaded free end receiving thereon a nut and tube expander. As braking surfaces wear, the piston stroke during brake actuation increases and becomes sufficient to move the adjuster tube axially along the tube expander deforming the tube and establishing a new retracted or rest position for the piston. This system accomplished the desired adjustment, but had excessive stress regions in the area of the pin threaded end.

U.S. Pat. No. 5,154,262 shows a technique for alleviating the stress regions while retaining the deforming member structure of a pin having a threaded end receiving a nut and tube expander. Here, the nut biases the tube expander against a chamfered pin shoulder. The tube expander has at least one inner diameter chamfer which engages the chamfered pin shoulder in order to impose preload forces upon the chamfered pin shoulder and reduce stresses at a smaller diameter portion of the pin. This patent illustrates several variations on the nut/expander configuration. An annular expander could be held in place by a castellated nut which receives a locking wire or pin extending through an opening in the threaded end of the pin. Alternatively, the tube expander and nut could comprise a one-piece expander nut having an enlarged radially extending end portion and the nut, when advanced along the threads of the pin, causes a chamfer of the end portion to advance along the chamfered pin shoulder and causes the end portion to deform elastically, improving the preload retention of the connection. In some implementations of these patented systems, the adjuster pin fixed end was square so as to not rotate about its axis when the nut was unthreaded. Brake pad replacement requires replacement of the adjuster tube. While this patented arrangement allowed removal of the adjuster tube without the need for removing the entire brake bushing portion of the housing, the square end was also susceptible to high stress region failure. When split ball adjuster pin failures have occurred, these failures frequently occurred near the small radius in the pin groove. In other implementations, the fixed end was conical and not susceptible to such failures, however, the conical fixed end configuration, which was provided with an allen wrench socket, required removal of the entire piston bushing from the remaining portion of the brake piston housing to gain access to the conical end to effect removal of the nut and replacement of the adjuster tube.

While these prior patented arrangements generally achieved their desired goals, some shortcomings remained. Elimination of the square fixed end stress regions required the undesirable removal of the brake piston bushing during maintenance and adjustment tube replacement. The threaded free end of the adjuster pin still experienced undesirably high stress regions near the base of the threads and where the castellated nut locking wire or cotter pin hole passed transversely through the pin. Due to the limited number of discrete angular positions for the castellated nut, appropriate torquing of the nut to establish the initial location and preload of the tube expander within the adjuster tube was difficult. U.S. Pat. No. 6,234,279 B1 solved many of these difficulties by employing an expandable tube or sleeve which surrounds a cantilevered pin having a split ball or split expander ring near a free end thereof. The split ball adjuster works in principle like any other tube and expander adjuster. It differs in how the expander is attached to the pin. The donut shaped expander is split into two essentially semicircular halves. This allows the expander to be placed into an annular groove in the pin and is then held there by the engaged adjuster tube. Consequently, the expander is attached to the pin without the use of a threaded connection. The benefits of a split ball adjuster are derived from the elimination of the threaded connection. These benefits include the potential for lower stresses in the pin and easier adjuster assembly. In this patented arrangement, the split ring halves are held in position within an annular groove of generally rectangular cross-sectional shape by the deformable adjuster tube. Upon excessive piston travel, the expander moves within the tube to establish a new retracted piston position. Depression of the piston to its initial position allows removal of the split ring and expandable tube allowing ready substitution of a new tube during brake maintenance.

This patented design employs an annular groove having square sides and very small fillets. The revolved cross section of the expander also has square sides and small rounds where it interfaces with the pin. A square side of the expander bears against a square side of the pin groove to transfer adjuster loads into the pin. The attendant small fillets in the groove cause locally high stresses in the pin.

It is desirable to still further reduce the likelihood of adjuster failure in braking systems of this type. This may be achieved by optimizing the shape of the expander/pin interface.

SUMMARY OF THE INVENTION

The present invention provides solutions to the above concerns and improves on the existing adjuster mechanisms by reducing the stresses in the key components. In particular, the adjuster pin/expander geometry is optimized to reduce the contact stresses and reduce the stress concentration in the pin. The groove in the pin of the split ball adjuster is no longer square sided, but has a curved cross section. The expander cross section similarly is not square, but is curved to ideally mate with the curved cross section of the annular groove in the pin. This curved groove shape results in significantly lower stresses in the adjuster pin as compared to either a threaded or square groove pin.

This pin/expander uses a relatively large radius on the respective contacting surfaces to minimize the contact stresses. While this presents an angled bearing surface, the stiffness of the adjuster tube, coupled with the direction of the surface normals where contact is made between the pin and expander relative to that of the expander and tube retains the expander in the pin groove without need of an additional component.

The invention comprises, in one form thereof, a piston adjuster mechanism having a deformable member disposed within and connected with a piston and a deforming member received within and engaging the deformable member. The deforming member takes the form of an elongated generally cylindrical cantilevered pin having an annular groove near its free end and a split annular expander ring received within the annular groove. The expander has a substantially identical pair of ring halves which, when joined, provide a smooth annular outer surface for engaging the deformable member in a first annular region, and a smooth annular inner surface for engaging the groove in a second annular region. In one preferred form, the areas where inner and outer contact occurs on the expander are constructed with constant radius curves. It is important that there be no perturbations to the smooth, continuous contour where contact takes place. The area of active contact is very small. Outside of the active contact area the groove can be a composite of several shapes but should be generally concave and the expander convex.

Either one or both of the smooth annular surfaces may be "flat-free", that is, have, in cross section, a finite radius of curvature throughout the region of contact. Either one or both of the smooth annular surfaces may be free of sharp corners, that is, have cross-sectional curve configurations which are continuous and have continuous first derivatives. Again, one or more of the contact surfaces may have a radius of curvature which begins at one edge with a rather small radius of curvature, increases to a greater radius of curvature and then decreases to a small radius of curvature near the opposite end of the surface. The increases and decreases may be monotonic. These curves may, for example, comprise tangentially joined conic section curves. Many other curves may generate the smooth annular surfaces. Either one or both of the contact regions may include more than one of these features.

An advantage of the present invention is that the easy removal and replacement of the adjuster tube is retained while reducing stress.

BRIEF DESCRIPTION OF THE DRAWINGS

Corresponding reference characters indicate corresponding parts throughout the several drawing views.

DETAILED DESCRIPTION OF THE INVENTION

Figure 1:
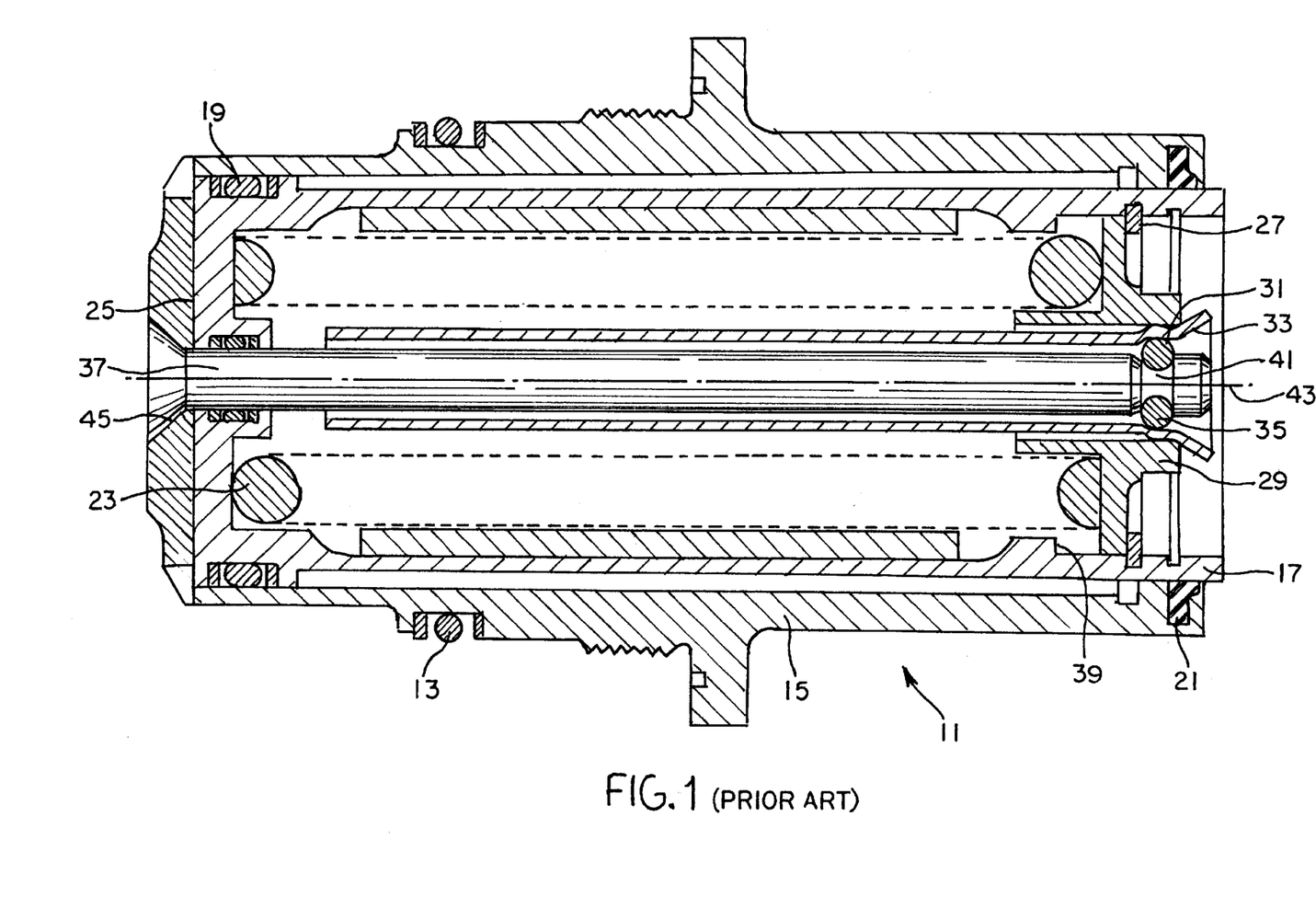
FIG. 1 is a cross-sectional view of a prior art automatic adjuster for a brake piston.
Figure 2:
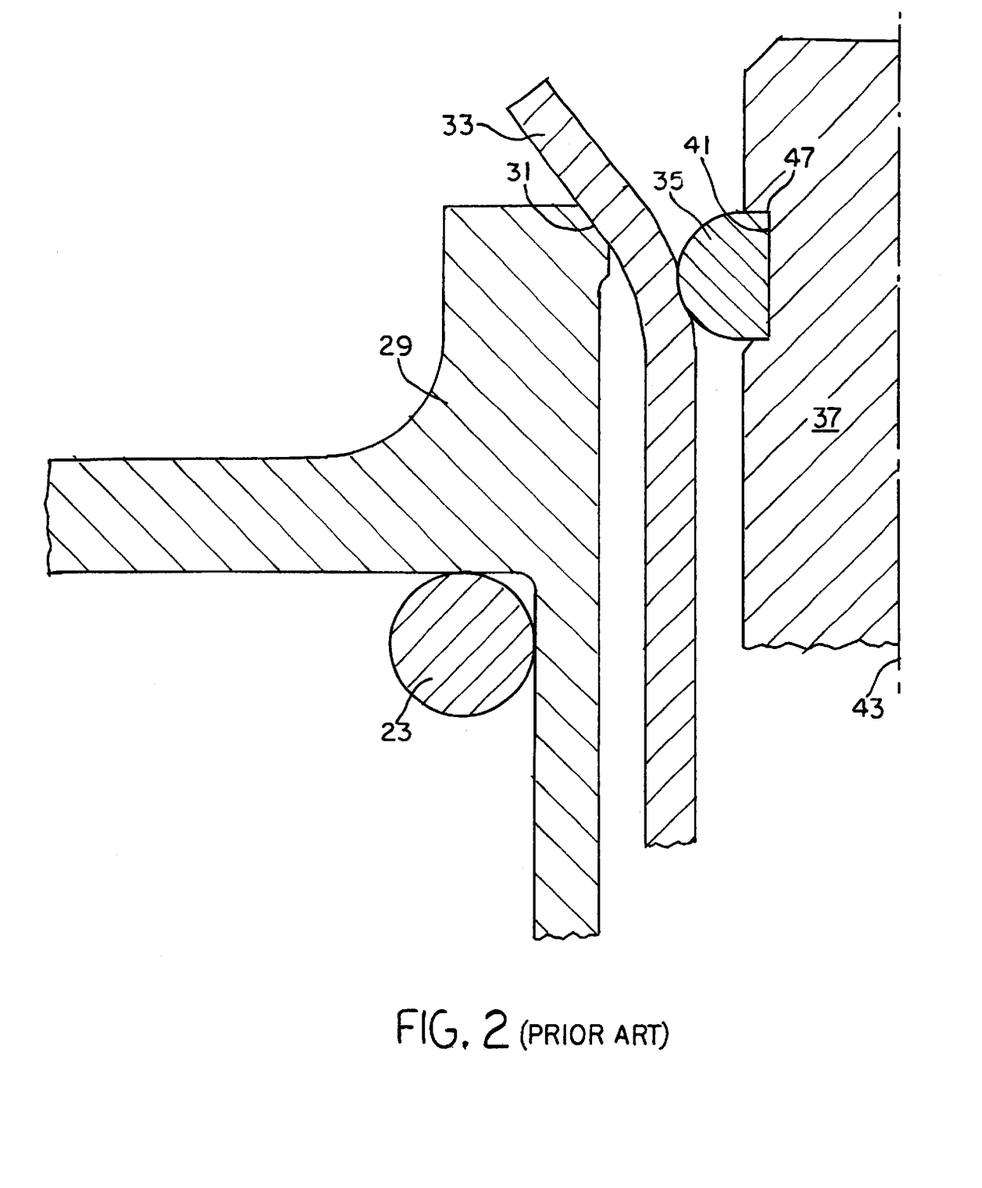
FIG. 2 is a cross-sectional view of a portion of FIG. 1 showing the cooperation between the pin, split ring and deformable tube.

Referring now to the drawings and particularly to FIGS. 1 and 2, there is shown a brake actuator mechanism 11 which may be threadedly received in a housing and sealed therein by O-ring 13. This prior art mechanism includes a housing containing a bushing portion 15, a piston 17 which is reciprocable in a cylindrical bore within the housing bushing 15, and having an O-ring seal 19 and an end seal or wiper 21. The right end of piston 17 typically receives an end flange (not shown) which selectively engages a pressure plate for compressing an interleaved stack of rotors and stators, one of a pair of caliper brake pads, or other friction configuration as is conventional. Within the piston 17, a helical spring 23 urges the spring retainer washer 29 into engagement with spring clip 27. Upon operator brake actuation, fluid acts on piston face 25 forcing the piston 17 rightwardly as viewed to apply the braking force. This rightward motion compresses spring 23, however, retainer washer 29, adjuster tube or sleeve 33 and adjuster pin 37 normally remain in fixed locations which determine an anchor position. The adjuster pin 37 has a conically flared end 45 which rests in a conical seat in a pin retainer at one end of the bushing 15 portion of the housing. The cylindrical bore, pin 37, tube 33 and annular expander 35 share a common axis 43. Except for friction, the adjuster pin is free to rotate about axis 43 in this conical seat while the mating conical surfaces provide cantilever support and hold the adjuster pin 37 in a fixed axial location.

Normally, full braking force is achieved before the retainer washer 29 engages the piston shoulder 39, hence, during normal braking, the adjuster tube 33, retainer washer 29 and adjuster pin 37 remain fixed. However, if sufficient wear has occurred, the shoulder 39 engages the washer 29 causing adjuster tube 33 to be pulled rightwardly along expander ring 35 thereby deforming or flaring the adjuster tube and establishing a new relative position between the adjuster tube 33 and adjuster pin 37. When the brake fluid pressure is relieved, the spring 23 returns the piston 17 leftwardly until the spring clip 27 again engages spring retainer washer 29. The frictional joint at 31 between the adjuster tube 33 and retainer washer 29 is unchanged. However, the retainer washer 29 and adjuster tube 33 are now at a new location along the expander ring 35 and the adjuster pin 37, hence, the rest position of the piston is now to the right of where it formerly was. Thus, if the piston 17 moves far enough to the right for the washer 29 to contact the spring clip 27, the adjuster tube 33 is forced along the expander ring 35, establishing a new position for the tube 33 and washer 29, and adjusting the retracted position of the piston. This, in turn, results in incrementally reestablishing the preferred brake clearance spacing.

During operation, the adjuster tube 33 is radially expanded further and further down its length to compensate for the reduced thickness of the braking friction members or disks and, when the disks require replacement with new disks of proper thickness, the adjuster tube 33 also needs to be replaced. Removal of the spent tube is accomplished by depressing the piston 17, washer 29, spring 23 and tube 33, toward the left as viewed relieving the radially inward retaining force of the tube against the expander ring allowing those ring halves to be removed from the groove 41. The tube is then free for removal.

During an adjustment event, the deformable tube 33 exerts considerable force on the expander ring 35 which forces are transmitted to the pin and tend to concentrate stresses in the groove 41, particularly in regions of inside sharp radius corners such as 47.

Figure 3:
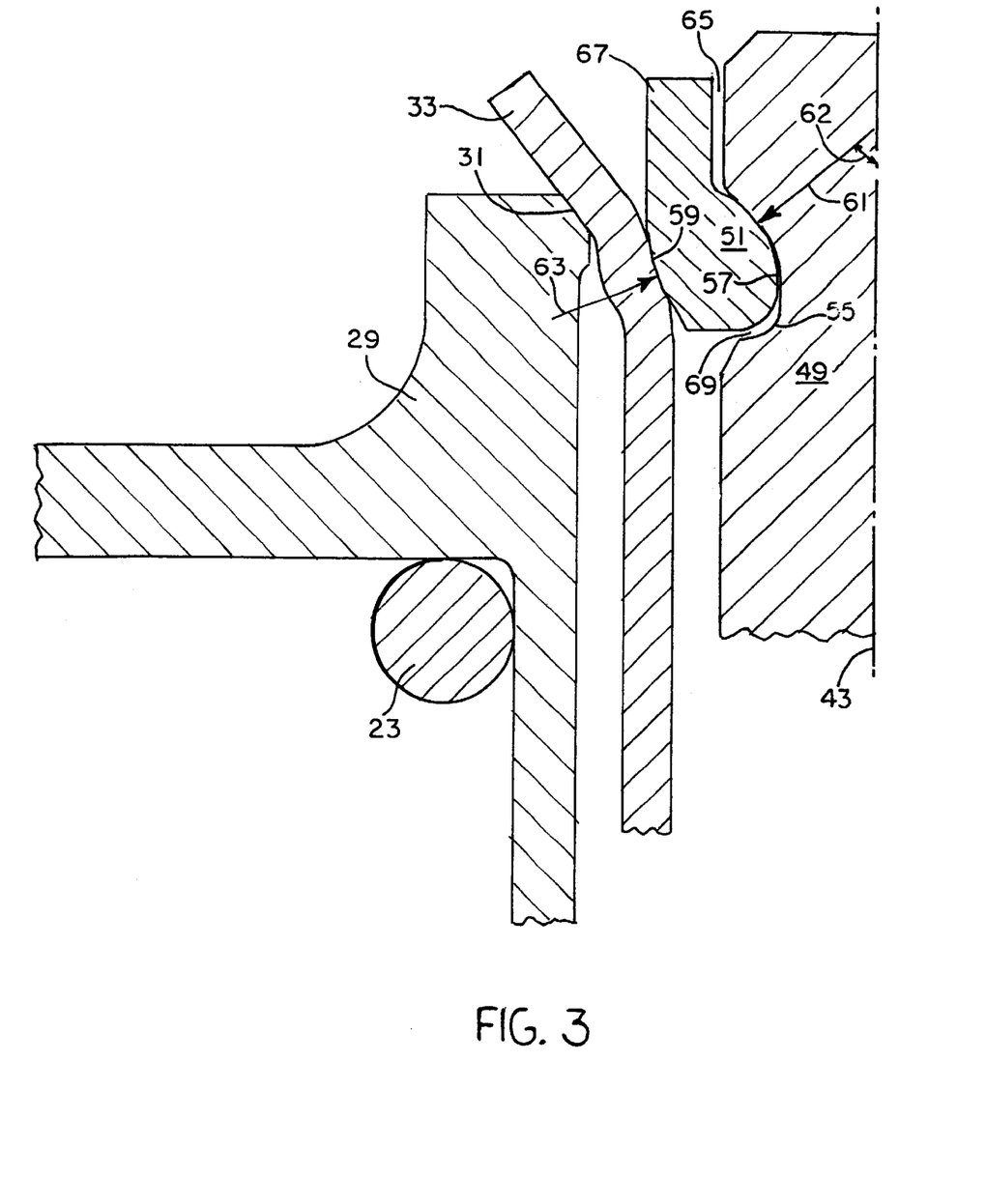
FIG. 3 is a cross-sectional view similar to FIG. 2, but showing one form of the present invention.

FIG. 3 illustrates a cantilevered pin 49 and split expander ring 51 which replace pin 37 and ring 35 of FIGS. 1 and 2. The first step or phase in the modification was to give the split expander ring a more streamlined shape (larger nose radius). A thus modified expander fits in the existing pin 37 groove of FIGS. 1 and 2 and thus allows continued use of existing pins. The next modification to the pin/expander was to replace the nearly square pin groove 41 with a larger radius groove to reduce the stress concentration. The pin and ring arrangement of FIG. 3 functions as a deforming member and minimizes stress concentrations and further reduces the likelihood of brake adjuster mechanism failure. Preferable, the split ring contact surfaces 57 and 59 as well as the pin groove surface 55 which contacts the split ring are designed as smooth arcuate surfaces with cross-sectional shapes which are portions of curved lines, for example, portions of conic sections such as circles or ellipses, and having no sharp corners (inner corners like 47 are particularly troublesome) and little or no flat regions. The expander 51 has a corner radius which is slightly smaller than the radius of the pin groove near the outboard extremity of their region of contact, that is, at the inboard extremity of the gap 65. A relatively large radius in the main region of contact serves to minimize contact driven stresses.

Still referring primarily to FIG. 3, a consequence of the curved or tapered shape of the expander/pin interface is the tendency of the expander 51 to "climb up" the side of the pin groove surface 55. This tendency is opposed by the interaction of the expander and adjuster tube 33. Since the inside diameter of the tube 33 is smaller than the outside diameter of the expander 51, the tube must be deformed to allow the expander to pull through the tube. This load imparted on the expander in this process has both an axial and a radial component. The axial component is the net pull through load. The radial component serves to hold the expander halves 97 and 99 in place in the pin groove. The cross section curvature of the outside of the expander influences the proportion of the axial and radial load components.

The principal purpose of the curvature of the cross section of the pin groove is to minimize stresses in the pin 49. Increasing the radius of the groove reduces the stress concentration, but also reduces the slope of the side of the groove making it easier for the expander to climb out of the groove. Consequently, the curvature of the groove must be coordinated with the outside shape of the expander to ensure that the inward radial force imposed on the expander by the tube exceeds the outward radial force imposed on the expander by the pin. The vector 63 is drawn normal to the curvature of the expander 51 at the point of contact with the tube 33. Vector 61 is drawn normal to the curvature of the pin groove at the point of contact with the expander. These vectors respectively illustrate the proportion of axial and radial forces at the two contacting areas. To ensure stability, the tube/expander normal 63 should be at a greater angle to (more nearly orthogonal to) the pin axis 43 than the expander/pin normal 61. Thus, vector 61 illustrates the normal forces between the surfaces of the pin 49 and expander ring 51. This vector forms an angle 62 of intersection with the cylindrical bore axis 43. Vector 63 illustrates the forces between the deformable tube 33 and the expander ring 51. The angle between the vector 63 and the bore axis 43 is greater than the angle 62. The effect is that the while the expander is forcing the tube radially outward, the tube is forcing the expander radially inward. This keeps the expander from climbing up the slope on the pin groove as long as the radial component of the force exerted on the expander by the pin (outward) is less than the radial component exerted by the tube (inward).

It has been observed that a large groove radius makes it easier for the expander to climb up the side of the groove. A natural consequence of the curved groove contour is that the normal to the pin surface is at an ever smaller angle with respect to the pin axis as you move along the contacting side from the bottom of the groove to the top. This is true for simple radii and many other practical concave shapes. The fact that the angle is decreasing means that if the expander did climb up the side it encounters a greater proportion of radial load vs. axial load as it proceeds. The curvature of the pin groove produces an increasingly steeper slope on the pin, so that any climbing by the expander up the groove is met with increasing resistance because of a diminished outward radial force component thereby insuring that the ring halves 97 and 99 (FIG. 8) are forced together and into the groove of the cantilevered pin 49.

The spring retaining washer 29 joins the sleeve or tube 33 at 31 and the sleeve and washer are movable axially along the expander 51 imparting additional deformation to the sleeve and relocating the anchor position only during an adjustment event when piston translation exceeds the predetermined distance. The region of contact between the expander and sleeve retains a smooth cross-sectional curve configuration throughout such an adjustment event.

The expander ring 51 further includes a hollow generally cylindrical skirt 67 best seen in FIGS. 3, 5, 6 and 8 which extends longitudinally toward the cantilevered pin 49 free end and coaxially with the cylindrical bore axis 43. This skirt provides increased strength and stability, helps out in several aspects of assembly and facilitates expander removal during brake maintenance.

As stated earlier, a larger groove radius lowers the stresses in the pin. There are two facets to this stress reduction. The stresses at the minimum section of the pin are affected by the stress concentration related to the groove shape. But the location of contact between the expander and pin can also affect the stresses at the minimum section. The point of contact should be moved as far from the minimum section as possible to isolate the peak contact stresses from the peak axial stresses at the minimum section.

The contact stresses in the pin groove are dependent on the shape of the expander and the shape of the groove at the point of contact. To avoid local peaks in the contact stresses, both members should have contours in the area of contact which are smooth, continuous curves. The simplest case is a constant radius (circular arc in cross section) defining the portion of the groove where contact may occur and a constant radius on the mating portion of the expander. The radius on the expander can be less than or equal to the radius on the groove. Away from the area of contact the contours can depart from a simple radius, but the groove will remain generally concave and the expander remain generally convex. More elaborate curved shapes such as elliptical curves, or composites of several different curves may also be employed in defining the respective mating contours.

Figure 4:
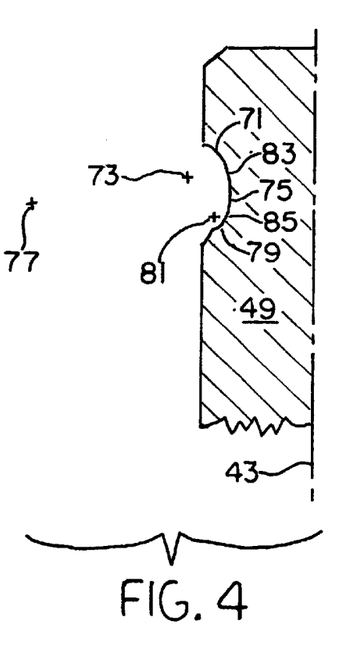
FIG. 4 illustrates one configuration of the pin groove of FIG. 3.

In FIG. 4, the shape of the pin free end and groove is generated by rotating the illustrated surface about the axis 43. The groove includes a central or intermediate arcuate portion 75 circular in shape and centered at 77. This circular arc tangentially blends into a second axially outboard arcuate region or portion 71 closest to the pin free end and of lesser radius of curvature formed by a circle centered at 73. A third axially inboard circular portion or region 79 closest to the pin cantilever supported end, also of lesser radius of curvature has a center at 81. The three circular portions are tangentially joined at 83 and 85 to form a smooth continuous curve which is free of corners and flat regions. The expander ring 51 contacts the groove 55 primarily in the outboard region 71 leaving the gap 69 along the inboard region 79.

Figure 5:
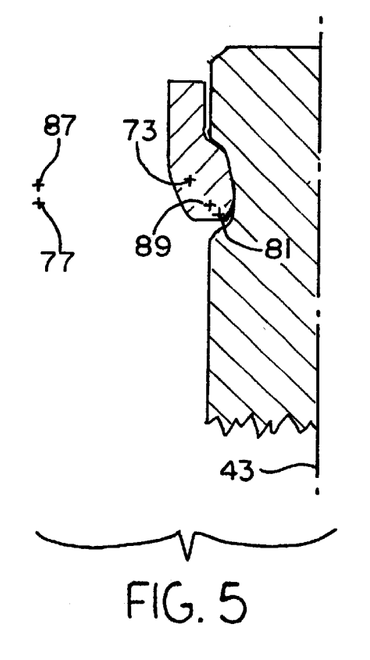
FIG. 5 illustrates a configuration of the split ring annular expander in conjunction with the pin groove of FIG. 4.

The corresponding inner annular surface of the split annular ring may be similarly formed from portions of circular curves having centers at 79, 87 and 89 as shown in FIG. 5. Dissimilar radii, or slightly different center locations provide the gaps 65 and 69 of FIGS. 3 and 6. Rotation of these surfaces about axis 43 generates the pin end and expander ring as shown in cross section in FIG. 6.

Figures 6, 7:
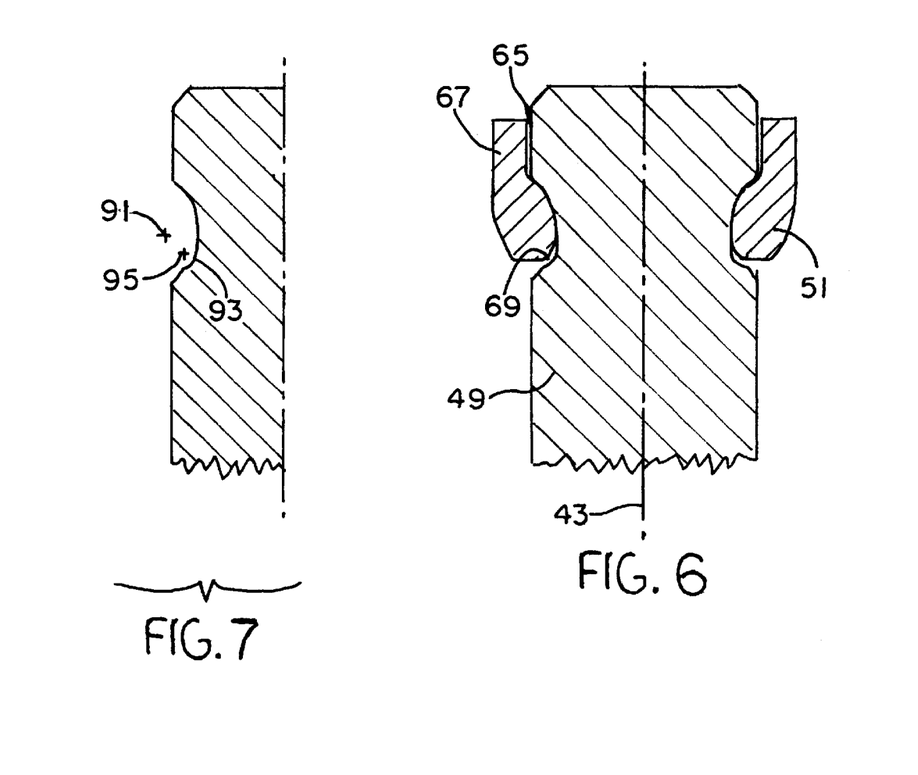
FIG. 6 is a cross-sectional view of the solids of revolution generated by the pin and split ring expander shapes of FIG. 5.
FIG. 7 is a view similar to FIG. 5, but showing an alternative pin groove configuration.

FIG. 7 illustrates another geometric technique for forming the contact surfaces. The potential contact surface contour is generated as slightly less than one-half of an ellipse having a center at 91. The semi-major axis extends vertically and the semi minor axis is horizontal. The ellipse blends tangentially at 93 with a circular portion centered at 95. This results in a groove contact region generating curve having a radius of curvature which, moving inwardly from the pin free end, is continually increasing up to a maximum and thereafter continually decreasing. Throughout the upper half of the elliptical portion of the contour, the radius of curvature monotonically increases. A function monotonically increases if $x_2 > x_1$ implies $f(x_2) > f(x_1)$. If the second relationship is less than or equal to (permitting flat regions or straight lines), the function is said to be monotonically nondecreasing. Decreasing monotone relationships are similarly defined. For example, in FIG. 3, the cross-sectional radius of curvature of the outboard region is monotonically nondecreasing as the axial distance from the free end increases. The cross-sectional radius of curvature of the inboard region is monotonically nonincreasing as the axial distance from the free end increases, and the cross-sectional radius of curvature of the central region reaches a maximum value between the monotonically changing regions.

A straight line has an undefined or infinite radius of curvature, however in FIGS. 4, 5 and 7, the contact surface generating curves have radii of curvature which remain finite throughout. Thus, no flat regions are involved in the contact. Moreover, these contact surface generating curves are continuous with continuous first derivatives. Thus, no corners are involved in the contact. Gaps such as 65 and 69 may be included to avoid contact at corners. Many other cross-sectional curve configurations are suitable so long as the generating curves avoid corners and flat regions, and the resulting contact regions fairly evenly distribute stresses rather than concentrating those stresses in a small region. In one preferred implementation, the pin and expander interface radii were optimized by finite element analysis (FEA) techniques to achieve the lowest possible pin stresses. Of course, since the expander ring is formed of two pieces as better seen in FIG. 8, and the parts are real rather than abstract mathematical entities, minor deviations from mathematically perfect surfaces will occur without violating their mathematical description. Also, the exemplary continuous smooth curves have certain points where the first derivative is not continuous even though the curve has no abrupt changes and remains smooth. For example, there are discontinuities at the two points where tangent lines to a circle are vertical. The continuous derivative terminology is intended to convey the concept of a smooth curve free of abrupt changes despite the presence of such singular exceptions.

Figure 8:
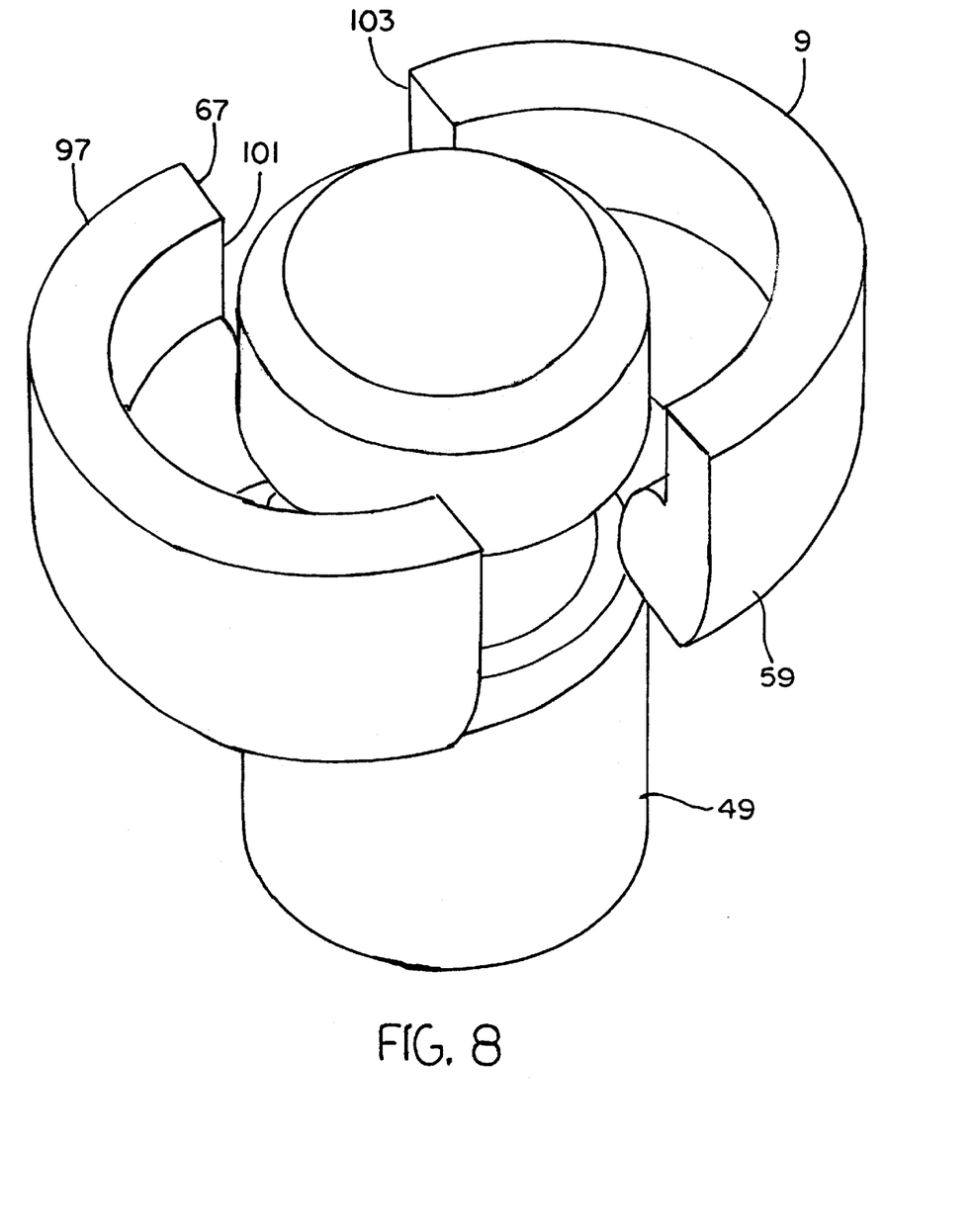
FIG. 8 is an exploded perspective view of a pin and expander ring according to the present invention.

FIG. 8 shows the split ring 51 and pin portion 49 of FIG. 6 in perspective. The ring halves 97 and 99 have their mating faces 101 and 103 urged into juxtaposition by the inward forces exerted by the tube 33 along vectors such as 63 of FIG. 3.

The techniques of the present invention are, of course, equally applicable to other piston actuated devices, for example, clutches which experience wear and require periodic adjustment.

What is claimed is:

1. A brake piston adjuster assembly comprising a housing having therein a cylindrical bore, a relatively fixed anchor location within the housing, a piston disposed slidably in the cylindrical bore to be extendable therefrom in response to the application of hydraulic pressure to one end thereof, a helical piston return spring disposed within the piston and having one end engaging the piston and another end engaging the relatively fixed anchor location within the housing, the spring adapted to compress as the piston is extended from the housing and to urge the piston further into the housing upon the reduction of hydraulic pressure on the piston one end, and means including a cantilevered adjuster pin extending coaxial with the cylindrical bore and having an annular groove receiving an annular expander near a free end thereof for modifying the anchor location to a new relatively fixed location within the housing in response to piston translation exceeding a predetermined distance thereby changing the location to which the spring returns the piston, the region of contact between the pin groove and annular expander comprising a surface of revolution which, in cross section, generally comprises a continuous curve having a continuous first derivative.

2. The brake piston adjuster assembly of claim 1, wherein the means for modifying the anchor location further includes a deformable tube extending generally coaxially along the adjuster pin and engaging an outer surface of the annular expander in a region comprising a further surface of revolution which, in cross section, generally comprises a further continuous curve having a continuous first derivative.

3. The brake piston adjuster assembly of claim 2, wherein at least one said surface of revolution has, in cross section, a finite radius of curvature throughout the corresponding region.

4. The brake piston adjuster assembly of claim 2, wherein the angles of intersection between normals to said further surface and the cylindrical bore axis are greater than the angles of intersection between normals to said surface and the cylindrical bore axis.

5. The brake piston adjuster assembly of claim 1, wherein the annular expander comprises a pair of expander halves joinable to form the annulus and includes a hollow generally cylindrical skirt extending longitudinally toward the cantilevered pin free end and coaxially with the cylindrical bore axis.

6. The brake piston adjuster assembly of claim 1, wherein the means for modifying the anchor location further includes a deformable tube telescopically surrounding the adjuster pin and split ring expander, and a spring retaining washer joined to the tube, the tube and washer being movable axially along the expander imparting additional deformation to the tube and relocating the anchor position only during an adjustment event when piston translation exceeds the predetermined distance, the region of contact between the expander and tube maintaining a smooth cross-sectional curve configuration throughout an adjustment event.

7. The brake piston adjuster assembly of claim 1, wherein the region of contact between the pin groove and annular expander comprises a surface of revolution which is generally a circular arc in cross section.

8. A piston adjuster mechanism comprising a deformable member disposed within and connected with a piston, a deforming member received within and engaging the deformable member, the deforming member comprising an elongated generally cylindrical cantilevered pin having an annular groove near the free end thereof, and an annular expander ring received within the annular groove and comprising a substantially identical pair of ring halves which, when joined, provide a smooth annular outer surface for engaging the deformable member in a first annular region, and a smooth annular inner surface for engaging the groove in a second annular region, at least one said ring surface having, in cross section, a finite radius of curvature throughout the corresponding region of contact.

9. The piston adjuster mechanism of claim 8, wherein each said ring surface is shaped, in cross section, as a circular arc.

10. The piston adjuster mechanism of claim 8, wherein both ring surfaces have, in cross section, a finite radius of curvature throughout their respective regions of contact.

11. The piston adjuster mechanism of claim 8, wherein the pin groove has, in cross section, a finite radius of curvature throughout the region of contact between the ring and groove.

12. The piston adjuster mechanism of claim 8, wherein at least one ring surface appears, in cross section as a generally continuous curve having a continuous first derivative.

13. A piston adjuster mechanism comprising a deformable member disposed within and connected with a piston, a deforming member received within and engaging the deformable member, the deforming member comprising an elongated generally cylindrical cantilevered pin having an annular groove near the free end thereof, and an annular expander ring received within the annular groove, a portion of the annular groove which receives the expander ring formed, in cross section, as a generally continuous curve having a continuous first derivative.

14. The piston adjuster mechanism of claim 13, wherein the annular groove portion is shaped, in cross section, as a circular arc.

15. The piston adjuster mechanism of claim 13, wherein the groove includes an axially outboard region closest to the pin free end, an axially inboard region closest to the pin cantilever supported end, and a central region intermediate the inboard and outboard regions, the cross-sectional radius of curvature of the outboard region monotonically nondecreasing as the axial distance from the free end increases, the cross-sectional radius of curvature of the inboard region monotonically nonincreasing as the axial distance from the free end increases, and the cross-sectional radius of curvature of the central region reaching a maximum value between the monotonically changing regions.

16. The piston adjuster mechanism of claim 15, wherein the expander ring contacts the groove primarily in the outboard region.

17. The piston adjuster mechanism of claim 15, wherein the cross-sectional radius of curvature of the central region is monotonically nondecreasing from the outboard region up to the maximum and then monotonically nonincreasing from the maximum to the inboard region.

18. The piston adjuster mechanism of claim 15, wherein the cross-sectional radius of curvature of the outboard region monotonically increases and the cross-sectional radius of curvature of the inboard region monotonically decreases.

19. A piston adjuster mechanism comprising a deformable member disposed within and connected with a piston, a deforming member received within and engaging the deformable member, the deforming member comprising an axially extending generally cylindrical cantilevered pin having an annular groove near the free end thereof, and an annular expander ring comprising a pair of similar ring halves received within the annular groove, the expander ring engaging the deformable member along an annular surface of the deformable member and the expander ring engaging the annular groove along an annular surface of the pin groove, normals to the deformable member surface being more nearly orthogonal to the pin axis than normals to the pin annular surface.

20. The piston adjuster mechanism of claim 19, wherein the pin annular surface is shaped, in cross section, as a circular arc.

* * * * *